US010585396B2

(12) United States Patent
Christmas et al.

(10) Patent No.: US 10,585,396 B2
(45) Date of Patent: Mar. 10, 2020

(54) HEAD-UP DISPLAY WITH DIFFUSER

(71) Applicant: TWO TREES PHOTONICS LIMITED, Buckinghamshire (GB)

(72) Inventors: Jamieson Christmas, Buckinghamshire (GB); Dackson Masiyano, Buckinghamshire (GB)

(73) Assignee: Two Trees Photonics Limited, Knowlhill (GB)

( * ) Notice: Subject to any disclaimer, the term of this patent is extended or adjusted under 35 U.S.C. 154(b) by 0 days.

(21) Appl. No.: 15/311,407

(22) PCT Filed: May 13, 2015

(86) PCT No.: PCT/GB2015/051396
§ 371 (c)(1),
(2) Date: Nov. 15, 2016

(87) PCT Pub. No.: WO2015/173558
PCT Pub. Date: Nov. 19, 2015

(65) Prior Publication Data
US 2017/0115627 A1    Apr. 27, 2017

(30) Foreign Application Priority Data
May 16, 2014  (GB) .................................. 1408809.0

(51) Int. Cl.
*G03H 1/08*    (2006.01)
*G03H 1/22*    (2006.01)
(Continued)

(52) U.S. Cl.
CPC ......... *G03H 1/2205* (2013.01); *G02B 5/0294* (2013.01); *G02B 27/0101* (2013.01);
(Continued)

(58) Field of Classification Search
CPC ........... G02B 5/02–0252; G02B 5/0273–0294; G02B 27/0103; G02B 27/0107;
(Continued)

(56) References Cited

U.S. PATENT DOCUMENTS 1,975,675 A   10/1934  Antelme
6,043,937 A    3/2000  Hudson et al.
(Continued)

FOREIGN PATENT DOCUMENTS

EP       2713197 A1    4/2014
JP    2003127707 A    5/2003
(Continued)

OTHER PUBLICATIONS

"Great Britain Application Serial No. 1408809.0, Search and Examination Report dated Nov. 17, 2014", 10 pgs.
(Continued)

*Primary Examiner* — Stephone B Allen
*Assistant Examiner* — Jyotsna V Dabbi
(74) *Attorney, Agent, or Firm* — McDonnell Boehnen Hulbert & Berghoff LLP (57) ABSTRACT

A head-up display for a windscreen having spatially variant optical power. The head-up display includes a diffuser arranged to display an image. The diffuser is shaped to compensate for the spatially variant optical power of the windscreen. A holographic projector may be provided, which is arranged to project the image for display onto the diffuser and includes a spatial light modulator arranged to apply a phase-delay distribution to incident light. The phase-delay distribution includes phase-only data representative of an object. The projector further includes Fourier transform means arranged to perform a Fourier transform of phase modulated light received from the spatial light modulator and to form the image on the diffuser.

14 Claims, 6 Drawing Sheets

(51) Int. Cl.
*G02B 5/02* (2006.01)
*G02B 27/01* (2006.01)
*G03H 1/16* (2006.01)

(52) U.S. Cl.
CPC ....... *G02B 27/0103* (2013.01); *G03H 1/0841* (2013.01); *G03H 1/16* (2013.01); *G03H 1/2294* (2013.01); *G02B 5/0263* (2013.01); *G02B 5/0278* (2013.01); *G02B 2027/011* (2013.01); *G03H 2001/085* (2013.01); *G03H 2001/221* (2013.01); *G03H 2001/2221* (2013.01); *G03H 2223/14* (2013.01); *G03H 2223/17* (2013.01); *G03H 2223/24* (2013.01); *G03H 2225/32* (2013.01)

(58) Field of Classification Search
CPC ........... G02B 27/017–0172; G02B 2027/0174; G02B 5/0263; G02B 5/0278; G02B 27/0101; G02B 2027/011; G03H 1/2205; G03H 1/0841; G03H 1/0858; G03H 1/16; G03H 1/2294; G03H 2001/085; G03H 2001/221; G03H 2001/2213–2218; G03H 2223/14; G03H 2223/17; G03H 2223/24; G03H 2225/32; G03H 1/08
USPC ...................................................... 359/9, 13
See application file for complete search history.

(56) References Cited

U.S. PATENT DOCUMENTS

| | | |
|---|---|---|
| 6,359,737 B1 | 3/2002 | Stringfellow |
| 6,885,483 B2 * | 4/2005 | Takada ..................... G02B 5/32 359/15 |
| 2005/0200962 A1 | 9/2005 | Voloschenko et al. |

FOREIGN PATENT DOCUMENTS

| | | | | |
|---|---|---|---|---|
| WO | WO2012007762 A1 * | 1/2012 | ............... | G03H 1/08 |
| WO | WO-2013061029 A1 | 5/2013 | | |

OTHER PUBLICATIONS

"International Application No. PCT/GB2015/051396, International Search Report dated Jul. 7, 2015", 7 pgs.

Buckley, E, et al., "Full Colour Holographic Laser Projector HUD", SID Vehicles and Photons 2008, 15th Annual Symposium on Vehicle Displays, (Oct. 17, 2008), 5 pgs.

* cited by examiner

HEAD-UP DISPLAY WITH DIFFUSER

FIELD OF THE INVENTION

This application is a U.S. National Stage Filing under 35 U.S.C. 371 from International Application No. PCT/GB2015/051396, filed on May 13, 2015, and published as WO2015/173558 A1 on Nov. 19, 2015, which claimed priority to GB Patent Application No. 1408809.0, filed on May 16, 2014, both of which are incorporated herein by reference in their entireties. The present disclosure relates to the field of head-up display. The present disclosure also relates to the field of diffusers and diffusers for compensating for a windscreen for head-up display.

BACKGROUND

Light scattered from an object contains both amplitude and phase information. This amplitude and phase information can be captured on, for example, a photosensitive plate by well-known interference techniques to form a holographic recording, or "hologram", comprising interference fringes. The "hologram" may be reconstructed by illuminating it with suitable light to form a holographic reconstruction, or replay image, representative of the original object.

It has been found that a holographic reconstruction of acceptable quality can be formed from a "hologram" containing only phase information related to the original object. Such holographic recordings may be referred to as phase-only holograms. Computer-generated holography may numerically simulate the interference process, using Fourier techniques for example, to produce a computer-generated phase-only hologram. A computer-generated phase-only hologram may be used to produce a holographic reconstruction representative of an object.

The term "hologram" therefore relates to the recording which contains information about the object and which can be used to form a reconstruction representative of the object. The hologram may contain information about the object in the frequency, or Fourier, domain.

It has been proposed to use holographic techniques in a two-dimensional image projection system. An advantage of projecting images using phase-only holograms is the ability to control many image attributes via the computation method—e.g. the aspect ratio, resolution, contrast and dynamic range of the projected image. A further advantage of phase-only holograms is that no optical energy is lost by way of amplitude modulation.

A computer-generated phase-only hologram may be "pixellated". That is, the phase-only hologram may be represented on an array of discrete phase elements. Each discrete element may be referred to as a "pixel". Each pixel may act as a light modulating element such as a phase modulating element. A computer-generated phase-only hologram may therefore be represented on an array of phase modulating elements such as a liquid crystal spatial light modulator (SLM). The SLM may be reflective meaning that modulated light is output from the SLM in reflection.

Each phase modulating element, or pixel, may vary in state to provide a controllable phase delay to light incident on that phase modulating element. An array of phase modulating elements, such as a Liquid Crystal On Silicon (LCOS) SLM, may therefore represent (or "display") a computationally-determined phase-delay distribution. If the light incident on the array of phase modulating elements is coherent, the light will be modulated with the holographic information, or hologram. The holographic information may be in the frequency, or Fourier, domain.

Alternatively, the phase-delay distribution may be recorded on a kinoform. The word "kinoform" may be used generically to refer to a phase-only holographic recording, or hologram.

The phase delay may be quantised. That is, each pixel may be set at one of a discrete number of phase levels.

The phase-delay distribution may be applied to an incident light wave (by illuminating the LCOS SLM, for example) and reconstructed. The position of the reconstruction in space may be controlled by using an optical Fourier transform lens, to form the holographic reconstruction, or "image", in the spatial domain. Alternatively, no Fourier transform lens may be needed if the reconstruction takes place in the far-field.

A computer-generated hologram may be calculated in a number of ways, including using algorithms such as Gerchberg-Saxton. The Gerchberg-Saxton algorithm may be used to derive phase information in the Fourier domain from amplitude information in the spatial domain (such as a 2D image). That is, phase information related to the object may be "retrieved" from intensity, or amplitude, only information in the spatial domain. Accordingly, a phase-only holographic representation of an object in the Fourier domain may be calculated.

The holographic reconstruction may be formed by illuminating the Fourier domain hologram and performing an optical Fourier transform, using a Fourier transform lens, for example, to form an image (holographic reconstruction) at a reply field such as on a screen.

Figure 1:
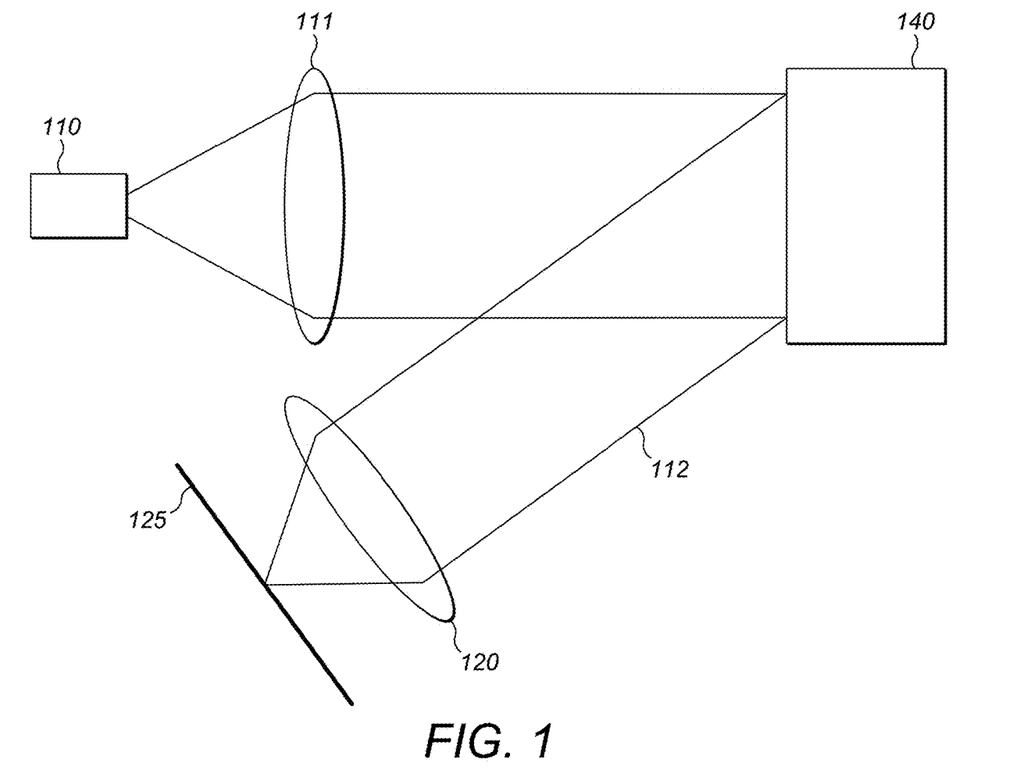
FIG. 1 is a schematic showing a reflective SLM, such as a LCOS, arranged to produce a holographic reconstruction at a replay field location.

FIG. 1 shows an example of using a reflective SLM, such as a LCOS-SLM, to produce a holographic reconstruction at a replay field location, in accordance with the present disclosure.

A light source (110), for example a laser or laser diode, is disposed to illuminate the SLM (140) via a collimating lens (111). The collimating lens causes a generally planar wavefront of light to become incident on the SLM. The direction of the wavefront is slightly off-normal (e.g. two or three degrees away from being truly orthogonal to the plane of the transparent layer). The arrangement is such that light from the light source is reflected off a mirrored rear surface of the SLM and interacts with a phase-modulating layer to form an exiting wavefront (112). The exiting wavefront (112) is applied to optics including a Fourier transform lens (120), having its focus at a screen (125).

The Fourier transform lens (120) receives a beam of phase-modulated light exiting from the SLM and performs a frequency-space transformation to produce a holographic reconstruction at the screen (125) in the spatial domain.

In this process, the light—in the case of an image projection system, the visible light—from the light source is distributed across the SLM (140), and across the phase modulating layer (i.e. the array of phase modulating elements). Light exiting the phase-modulating layer may be distributed across the replay field. Each pixel of the hologram contributes to the replay image as a whole. That is, there is not a one-to-one correlation between specific points on the replay image and specific phase-modulating elements.

The Gerchberg Saxton algorithm considers the phase retrieval problem when intensity cross-sections of a light beam, $I_A(x,y)$ and $I_B(x,y)$, in the planes A and B respectively, are known and $I_A(x,y)$ and $I_B(x,y)$ are related by a single Fourier transform. With the given intensity cross-sections, an approximation to the phase distribution in the planes A and B, $\Phi_A(x,y)$ and $\Phi_B(x,y)$ respectively, is found. The Gerchberg-Saxton algorithm finds solutions to this problem by following an iterative process.

The Gerchberg-Saxton algorithm iteratively applies spatial and spectral constraints while repeatedly transferring a data set (amplitude and phase), representative of $I_A(x,y)$ and $I_B(x,y)$, between the spatial domain and the Fourier (spectral) domain.

The spatial and spectral constraints are $I_A(x,y)$ and $I_B(x,y)$ respectively. The constraints in either the spatial or spectral domain are imposed upon the amplitude of the data set. The corresponding phase information is retrieved through a series of iterations.

A holographic projector may be provided using such technology. Such projectors have found application in head-up displays for vehicles.

The use of head-up displays in automobiles is becoming increasing popular. Head-up displays are broken down in to two main categories, those which use a combiner (a free standing glass screen whose purpose is to reflect a virtual image in to the driver's line of sight) and those which utilise the vehicle's windscreen to achieve the same purpose.

The dominant technology used for generating head up display imagery is the LED back lit Liquid Crystal Displays. Though well-established these displays suffer from poor contrast, limited colour gamut and limited brightness.

There has also been demonstrated a new display technology based upon the use of phase only holograms to render a high quality, very high brightness display with an extremely wide colour gamut. This type of holographic display is ideally suited for use in head up displays.

Some display systems, including holographic-based systems, need to use a fixed diffuser or similar component to increase the viewing angle. This diffuser serves as a key component in the imaging system; its distance from the projection optic (normally a freeform mirror) determines the virtual image distance from the viewer's eye.

Figure 2:
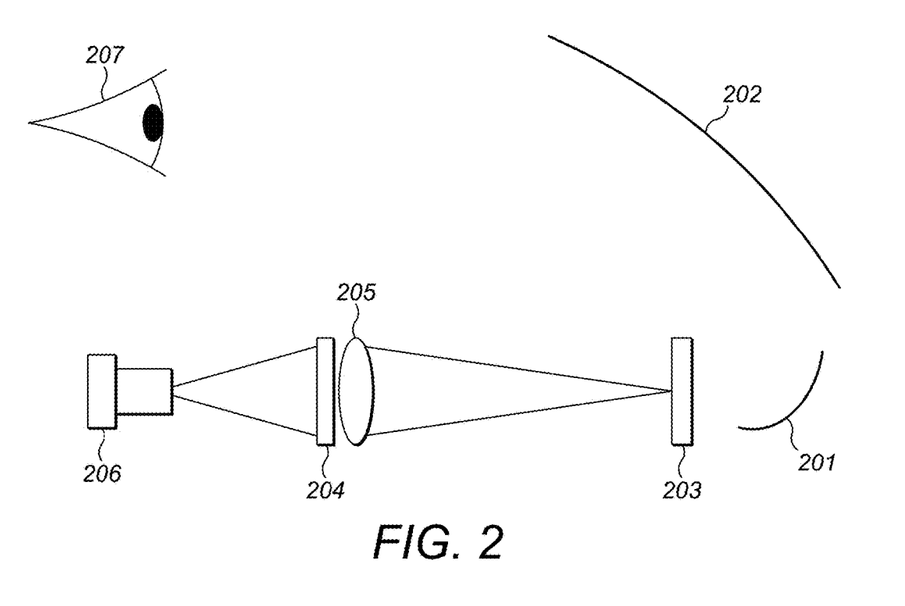
FIG. 2 shows a so-called "indirect view" holographic projector for a head-up display of a vehicle.

FIG. 2 shows an example head-up display comprising a light source 206, a spatial light modulator 204 arranged to spatially modulate light from the light source with holographic data representative of an image for projection, a Fourier transform optic 205, a diffuser 203, a freeform mirror 201, a windscreen 202 and a viewing position 207. FIG. 2 shows a so called "indirect view" system in which a real image of the holographic reconstruction is formed at a replay field on the diffuser 203. A holographic reconstruction is therefore projected on the diffuser 203 and may be viewed from viewing position 207 by focusing on the diffuser 203. The projected image is viewed via a first reflection off freeform mirror 201 and a second reflection off windscreen 202. The diffuser acts to increase the numerical aperture of the holographic system, fully illuminating the freeform mirrors thereby allowing the virtual image to be viewed by a driver, for example.

For completeness only, it may be noted that the holographic reconstruction may be alternatively be viewed directly. Using "direct view" holography does enable information to be presented in 3D, however as the name suggests direct view requires the viewer to look at the hologram directly without a diffuser between the viewer and the light source. This type of 3D display has a number of problems, firstly the current generation of phase modulators have a relatively small diffraction angle and therefore to create a sufficiently large viewing area (eye-box) requires the use of complex and expensive optics parts. Secondly and more importantly, this type of configuration required the viewer to be directly exposed to laser radiation. There are very strict regulations surrounding the use of lasers and providing a sufficiently robust safety system that will ensure that the eye is never exposed to dangerous levels to laser radiation significantly increases the system complexity. The use of a diffuser between the viewer and the projection engine mitigates both of the issues highlighted above.

The present disclosure relates to systems using indirect view wherein the user views a virtual image reflected off a windscreen.

Figure 3:
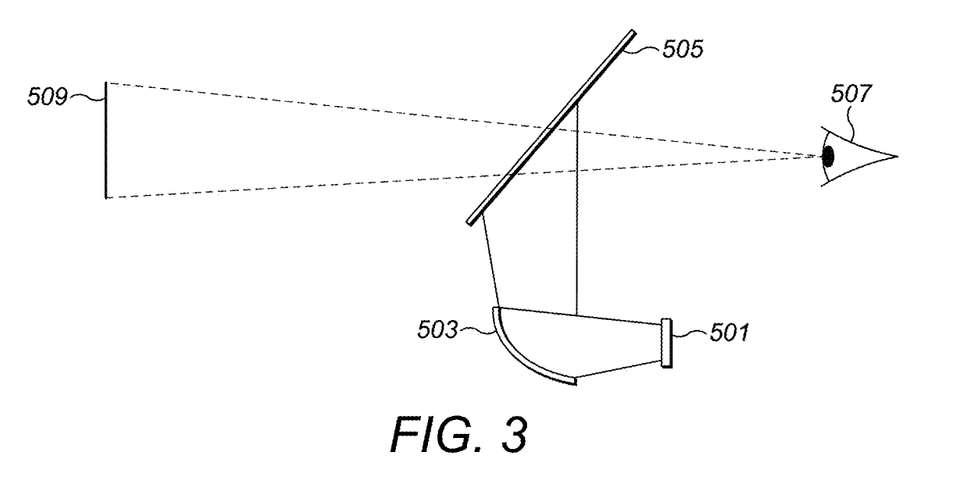
FIG. 3 shows a conventional head-up display used with an ideal flat windscreen.

FIG. 3 shows the structure of a conventional head-up display utilising a back-lit LCD as the image display medium. In more detail, FIG. 3 shows a backlit LCD 501 arranged to display an image. Light from backlit LCD 501 is gathered by a mirror possessing optical power 503, having optical power, and reflected toward a region of the windscreen 505. A small percentage of the light is reflected off the windscreen 505 towards the viewer 507. Accordingly, a virtual image 509 is seen by the viewer 507. The windscreen 505 of FIG. 3 is flat which gives rise to a flat undistorted virtual image 509.

However all windscreens have an amount of curvature associated with them, this curvature manifests itself as an optical power which degrades the projected image quality. The image degradation can be seen as a change in virtual image projection along with astigmatism in the individual pixels that make up the image.

Figure 4:
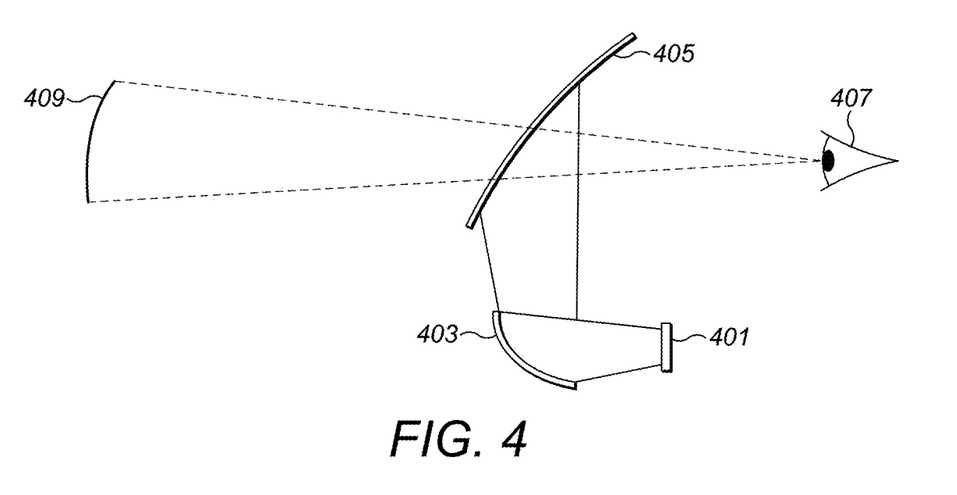
FIG. 4 shows a conventional head-up display used with realistic curved windscreen.

FIG. 4 shows the structure of a conventional head-up display utilising a back-lit LCD as the image display medium and a curved windscreen 405. In more detail, FIG. 4 shows a backlit LCD 401 arranged to display an image. Light from backlit LCD 401 is gathered by mirror possessing optical power (for example, a parabolic mirror) 403, having optical power, and reflected toward a region of the windscreen 405. A small percentage of the light is reflected off the windscreen 405 towards the viewer 407. Accordingly, a virtual image 409 is seen by the viewer 407. The windscreen 405 of FIG. 5 is curved which gives rise to a distorted virtual image 409. Specifically, the virtual image is distorted by the optical power of the windscreen.

Normally, these distortions are corrected as much as possible by altering the surface characteristics of the parabolic mirror, this means that the mirror surface becomes a free-form shape which is designed to work with just one windscreen. The combination of the extremely precise freeform shape and the low production volumes associated with having one unique mirror for each windscreen means that these parts are extremely expensive to manufacture.

The present disclosure aims to provide an improved head-up display for non-flat windscreens.

SUMMARY OF THE INVENTION

Aspects of an invention are defined in the appended independent claims.

The present disclosure relates to a head-up display for a windscreen having spatially variant optical power such as a curved or non-flat windscreen. The head-up display utilises a modified or shaped diffuser such as a freeform diffuser. Specifically, the diffuser is shaped to compensate for the image distortion caused by the spatially variant optical power of the windscreen. The diffuser is therefore customised to the windscreen. However, this is significantly advantageous to customising the mirror typically used in modern head-up displays.

BRIEF DESCRIPTION OF THE DRAWINGS

Embodiments will now be described to the accompanying drawings in which.

In the drawings, like reference numerals referred to like parts.

DETAILED DESCRIPTION OF THE DRAWINGS

The present disclosure relates to an improved so-called "indirect view" system in which a viewer views a virtual image of a holographic reconstruction. However, the disclosed indirect view system is equally suitable for indirectly viewing any type of image visible on a diffuser. That is, although embodiments describe indirect view of a holographic reconstruction, the indirectly viewed image need not necessarily be a holographic reconstruction. In other words, the present disclosure is equally applicable to other display systems such as more conventional LED backlit liquid crystal display projectors and the like. Embodiments describe a method of computer-generating a hologram by way of example only.

Holographically-generated 2D images are known to possess significant advantages over their conventionally-projected counterparts, especially in terms of definition and efficiency.

Modified algorithms based on Gerchberg-Saxton have been developed—see, for example, co-pending published PCT application WO 2007/131650 incorporated herein by reference.

Figure 5:
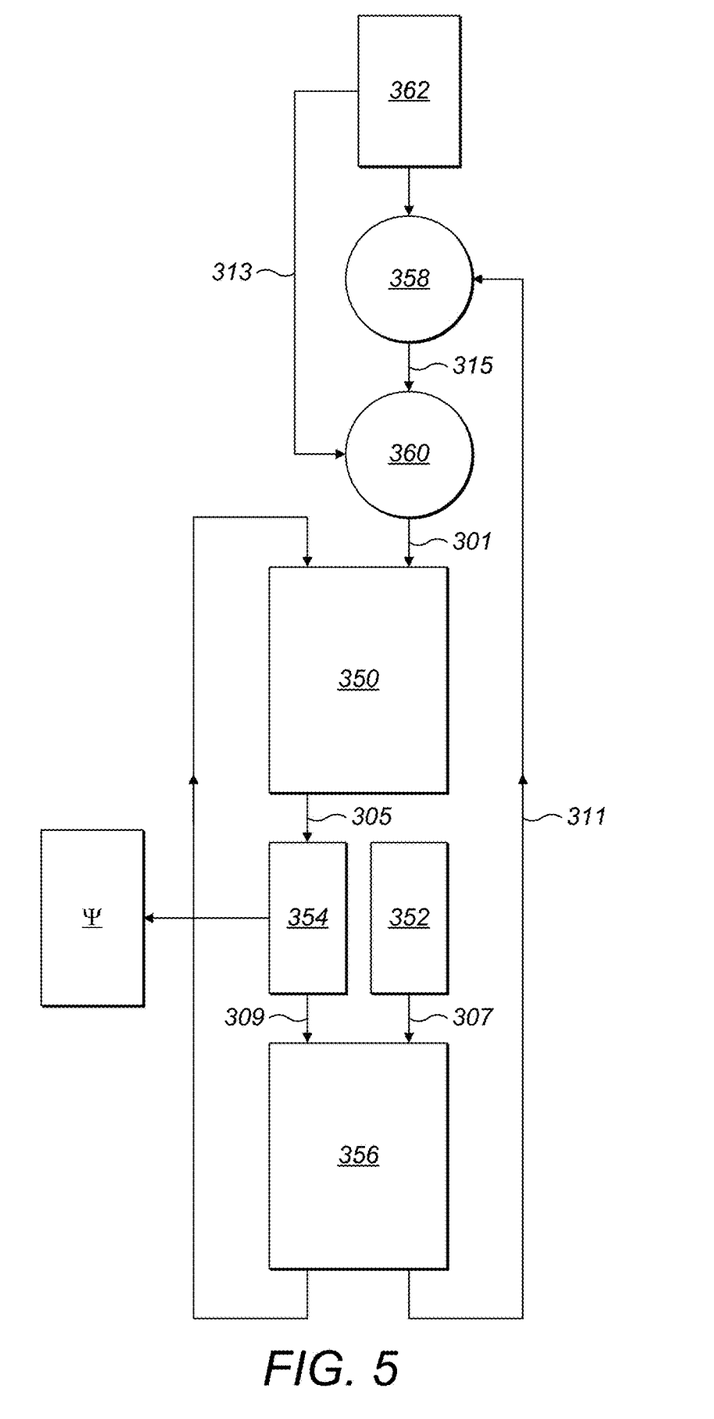
FIG. 5 shows an example algorithm for computer-generating a phase-only hologram.

FIG. 5 shows a modified algorithm which retrieves the phase information ψ[u,v] of the Fourier transform of the data set which gives rise to a known amplitude information T[x,y] 362. Amplitude information T[x,y] 362 is representative of a target image (e.g. a photograph). The phase information ψ[u,v] is used to produce a holographic representative of the target image at an image plane.

Since the magnitude and phase are intrinsically combined in the Fourier transform, the transformed magnitude (as well as phase) contains useful information about the accuracy of the calculated data set. Thus, the algorithm may provide feedback on both the amplitude and the phase information.

The algorithm shown in FIG. 5 can be considered as having a complex wave input (having amplitude information 301 and phase information 303) and a complex wave output (also having amplitude information 311 and phase information 313). For the purpose of this description, the amplitude and phase information are considered separately although they are intrinsically combined to form a data set. It should be remembered that both the amplitude and phase information are themselves functions of the spatial coordinates (x,y) for the farfield image and (u,v) for the hologram, both can be considered amplitude and phase distributions.

Referring to FIG. 5, processing block 350 produces a Fourier transform from a first data set having magnitude information 301 and phase information 303. The result is a second data set, having magnitude information and phase information $\psi_n[u,v]$ 305. The amplitude information from processing block 350 is set to a distribution representative of the light source but the phase information $\psi_n[u,v]$ 305 is retained. Phase information 305 is quantised by processing block 354 and output as phase information ψ[u,v] 309. Phase information 309 is passed to processing block 356 and combined with the new magnitude by processing block 352. The third data set 307, 309 is applied to processing block 356 which performs an inverse Fourier transform. This produces a fourth data set $R_n[x,y]$ in the spatial domain having amplitude information 311 and phase information 313.

Starting with the fourth data set, its phase information 313 forms the phase information of a fifth data set, applied as the first data set of the next iteration 303'. Its amplitude information $R_n[x,y]$ 311 is modified by subtraction from amplitude information T[x,y] 362 from the target image to produce an amplitude information 315 set. Scaled amplitude information 315 (scaled by α) is subtracted from target amplitude information T[x,y] 362 to produce input amplitude information η[x,y] 301 of the fifth data set for application as first data set to the next iteration. This is expressed mathematically in the following equations:

$$R_{n+1}[x,y]=F'\{\exp(i\psi_n[u,v])\}$$

$$\psi_n[u,v]=\angle F\{\eta\cdot\exp(i\angle R_n[x,y])\}$$

$$\eta=T[x,y]-\alpha(|R_n[x,y]|-T[x,y])$$

Where:
F' is the inverse Fourier transform;
F if the forward Fourier transform;
R is the replay field;
T is the target image;
∠ is the angular information;
Ψ is the quantized version of the angular information;
ε is the new target magnitude, ε≥0; and
α is a gain element ~1.

The gain element a may be predetermined based on the size and rate of the incoming target image data.

Figure 6:
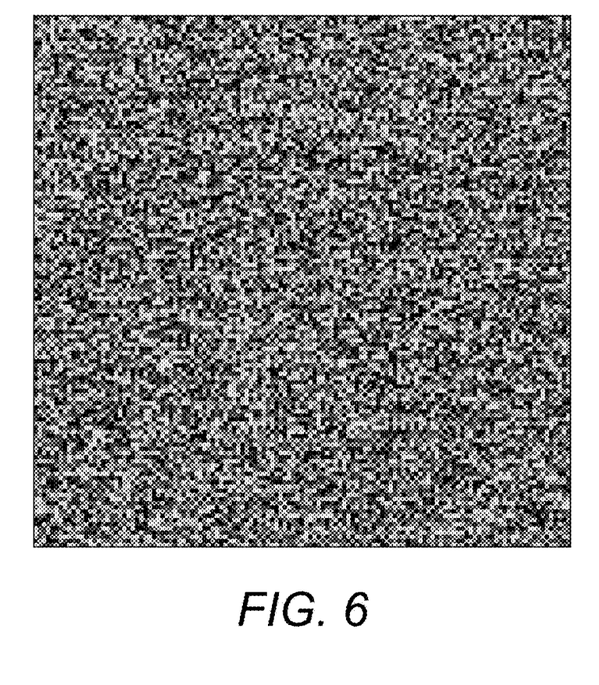
FIG. 6 shows an example random phase seed for the example algorithm of FIG. 5.

In the absence of phase information from the preceding iteration, the first iteration of the algorithm uses a random phase generator to supply random phase information as a starting point. FIG. 6 shows an example random phase seed.

In a modification, the resultant amplitude information from processing block 350 is not discarded. The target amplitude information 362 is subtracted from amplitude information to produce a new amplitude information. A multiple of amplitude information is subtracted from amplitude information 362 to produce the input amplitude information for processing block 356. Further alternatively, the phase is not fed back in full and only a portion proportion to its change over the last two iterations is fed back. Accordingly, Fourier domain data representative of an image of interest may be formed.

Figure 7:
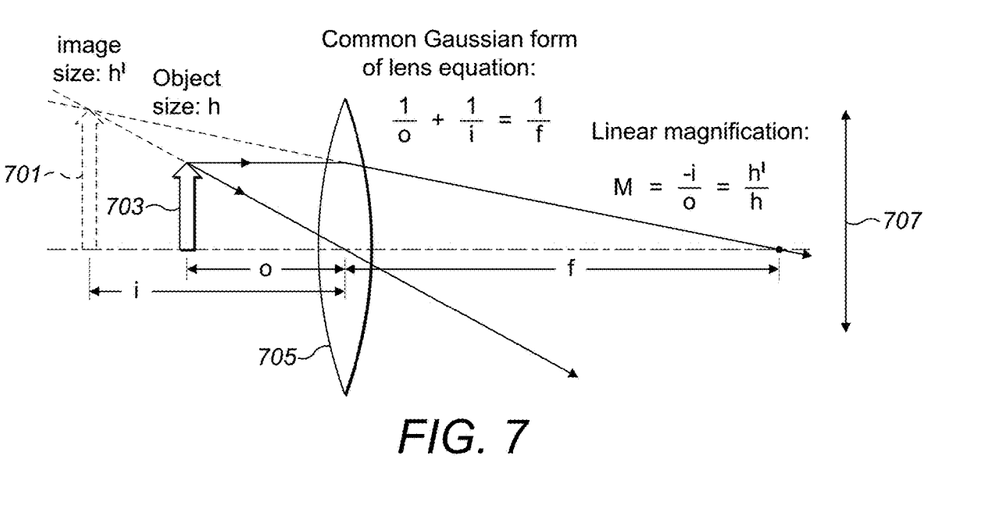
FIG. 7 is a virtual imaging schematic.

FIG. 7 shows an embodiment of the present disclosure in which a virtual projection optic 705 forms a virtual image 701 of an object 703. The object 703 is visible on a diffuser. The virtual image 701 is seen from observation plane 707.

The virtual image distance is set by placing the object inside the focal length of the imaging optic, the apparent virtual distance may then be calculated.

For the optical schematic shown above, the virtual image distance (i) is determined by the following equation:

$$i = \frac{1}{\frac{1}{f} - \frac{1}{o}} \quad (1)$$

A linear change in the object distance causes a non-linear change in the virtual distance.

The virtual image has to be sufficiently far from the eye so that the eye refocusing time from infinity, which is the normal focal length when driving, to the display information is small thereby reducing the blind flight time. However, the virtual image distance must also be sufficiently close so that the information presented to the driver is clearly legible. These two competing factors normally result in the virtual image distance being configured such that the essential driving information is presented at a distance of 1.5 to 3.5 m, optionally 2.5 m, from the driver's eye.

The inventors have recognised that by simulating the optical system in reverse, from the virtual image back to the object (or image source) via a standard mirror possessing optical power, it is possible to see the level of deformation that the system will be required to deal with.

In accordance with the present disclosure, there is provided a head-up display for a windscreen using a non-flat diffuser to compensate for the windscreen. Accordingly, a conventional mirror possessing optical power (e.g. parabolic) may be used. The shaped diffuser in accordance with the present disclosure is equally suitable for LCD based systems and projection based systems such as a holographic projector as described in embodiments by way of example only.

There is therefore provided a head-up display for a windscreen having spatially variant optical power, the head-up display comprising a diffuser arranged to display an image, wherein the diffuser is shaped to compensate for the spatially variant optical power of the windscreen.

Likewise, there is provided a corresponding method of compensating for the spatially variant optical power of a windscreen for head-up display, the method comprising: displaying an image on a diffuser; shaping the diffuser to compensate for the spatially variant optical power of the windscreen; and forming a virtual image of the image using the windscreen.

The inventors have recognised that by shaping the diffuser in accordance with the spatial image deformation, it is possible to achieve a high quality virtual image using a standard parabolic mirror. The mirror would therefore be suitable for use in a wide range of vehicles and would have a simpler surface characteristic significantly lowering the production costs. The diffuser would be designed on a per windscreen basis, however because of its smaller size would not have a significant cost impact on the system.

It may therefore be understood that in embodiments, the head-up display further comprises a mirror arranged to receive light from the diffuser and redirect the received light onto the windscreen. In embodiments, the mirror possesses optical power, such as a standard parabolic mirror. Notably, the mirror possessing optical power does not need to be custom made for the particular windscreen. In other words, the parabolic mirror may be a standard off-the-shelf parabolic mirror.

It may be understood that, in embodiments, the windscreen forms a virtual image of the image displayed by the diffuser. That is, the user views a reflection of the diffuser in the windscreen.

In embodiments, the head-up display further comprises a projector arranged to project the image for display onto the diffuser. There is also therefore provided a corresponding method comprising projecting the image onto the diffuser. However, as can be understood from the foregoing, the image may be displayed on the diffuser by any means.

In advantageous embodiments, the projector is a holographic projector comprising: a spatial light modulator arranged to apply a phase-delay distribution to incident light, wherein the phase-delay distribution comprises phase-only data representative of an object; and Fourier transform means arranged to perform a Fourier transform of phase modulated light received from the spatial light modulator and form the image on the diffuser. There is also therefore provided a corresponding method wherein projecting the image onto the diffuser further comprises: illuminating a spatial light modulator with incident light to apply a phase-delay distribution to the incident light, wherein the phase-delay distribution comprises phase-only data representative of an object; and performing a Fourier transform of the phase modulated light received from the spatial light modulator and forming the image on the diffuser. A holographic system has advantages because the individual pixels can be computed to form in perfect focus at every point on the complex surface of the diffuser.

In an embodiment, the Fourier transform means is a physical lens arranged to perform an optical Fourier transform. In other embodiments, the Fourier transform means utilised by the holographic projector is not a physical optic but, instead, a further phase only lens implemented using holographic techniques.

It is known in the art how to calculate data a phase-only programmable lens—that is, data providing a lensing effect. It is also known in the art how phase-only programmable lens data may be combined with phase-only data representative of an object. In embodiments, the data is combined by simple vector addition.

In an embodiment, the image displayed on the diffuser is a holographic reconstruction of a predetermined object.

Figure 8:
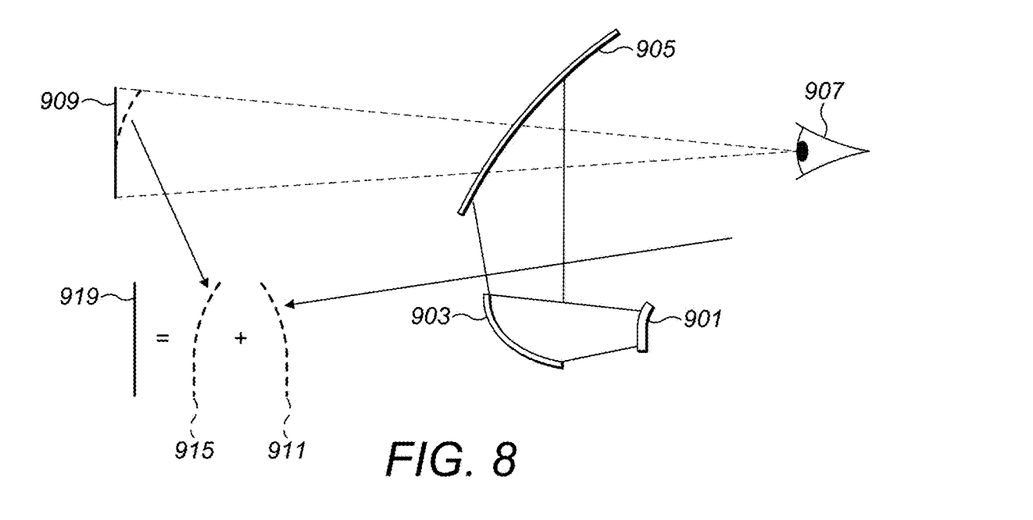
FIG. 8 is shows a diffuser having spatially variant optical power in accordance with embodiments of the present disclosure.

Embodiments utilising the disclosed holographic projector are advantageous because the phase-delay distribution (the "holographic recording") may be readily modified to bring the image to a non-planar focus. For example, the phase-delay distribution may be computer calculated to provide an optical distortion which compensates for the optical distortion of the windscreen. This is shown in FIG. 8. In more detail, FIG. 8 shows a head-up display utilising a non-flat diffuser 901 as the image display medium. Diffuser 901 is arranged to display an image. In embodiment, the image is projected onto the diffuser 901. Light from the diffuser 901 is gathered by parabolic mirror 903 and reflected toward a region of the windscreen 905. A small percentage of the light is reflected off the windscreen 905 towards the viewer 907. Accordingly, a virtual image 909 is seen by the viewer 907. It will be apparent that first optical distortion 911 created by the non-flat diffuser 901 combines with second optical distortion 915 created by the windscreen 905 to form an undistorted virtual image 919.

In embodiments, the head-up display further comprises a laser arranged to produce the incident light for the spatial light modulator. The present disclosure is particularly well suited to laser projection-based system whose large depth of field would overcome any focus issues associated with the use of a non-flat diffuser.

Figure 9:
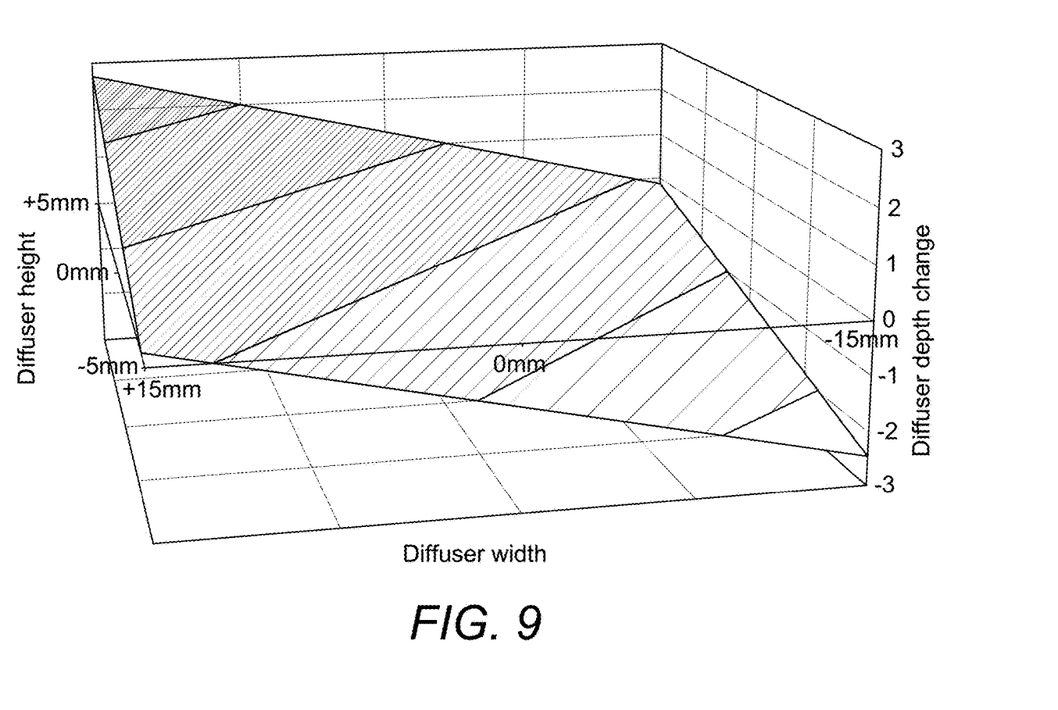
FIG. 9 shows the outputs of a simulation of the non-flat diffuser in accordance with embodiments of the present disclosure.

By way of an example, a diffuser was designed based upon the use of a convention lens being used to form the virtual image, and a windscreen with significantly different curvature in X & Y directions. The outputs of the simulation are shown in below and in FIG. 9.

TABLE 1

Diffuser Characteristics

| Height | Width | | |
|---|---|---|---|
|  | −15 mm | 0 | +15 mm |
| +5 mm | −0.15 mm | 1.22 mm | 2.7 mm |
| 0 | −1.34 mm | 0 | 1.49 mm |
| −5 mm | −2.5 mm | −1.21 mm | 0.24 mm |

It can be understood that a head-up display may display a variety of information as known in the art. Holograms corresponding to all the possible displays may be therefore be pre-calculated and stored in a repository, or calculated in real-time. In an embodiment, the projector further comprises a repository of Fourier domain data representative of a plurality of 2D images.

Embodiments described herein relate to Fourier holography by way of example only.

The present disclosure is equally applicable to Fresnel holography in which Fresnel transform is applied during calculation of the hologram.

The quality of the reconstructed hologram may be affect by the so-called zero order problem which is a consequence of the diffractive nature of the reconstruction. Such zero-order light can be regarded as "noise" and includes for example specularly reflected light, and other unwanted light from the SLM.

This "noise" is generally focussed at the focal point of the Fourier lens, leading to a bright spot at the centre of a reconstructed hologram. Conventionally, the zero order light is simply blocked out however this would clearly mean replacing the bright spot with a dark spot.

Alternatively and angularly selective filter could be used to remove only the collimated rays of the zero order. Other methods of managing the zero order may also be used.

Whilst embodiments described herein relate to displaying one hologram per frame, the present disclosure is by no means limited in this respect and more than one hologram may be displayed on the SLM at any one time.

For example, embodiments implement the technique of "tiling", in which the surface area of the SLM is further divided up into a number of tiles, each of which is set in a phase distribution similar or identical to that of the original tile. Each tile is therefore of a smaller surface area than if the whole allocated area of the SLM were used as one large phase pattern. The smaller the number of frequency component in the tile, the further apart the reconstructed pixels are separated when the image is produced. The image is created within the zeroth diffraction order, and it is preferred that the first and subsequent orders are displaced far enough so as not to overlap with the image and may be blocked by way of a spatial filter.

As mentioned above, the image produced by this method (whether with tiling or without) comprises spots that form image pixels. The higher the number of tiles used, the smaller these spots become. If one takes the example of a Fourier transform of an infinite sine wave, a single frequency is produced. This is the optimum output. In practice, if just one tile is used, this corresponds to an input of a single cycle of a sine wave, with a zero values extending in the positive and negative directions from the end nodes of the sine wave to infinity. Instead of a single frequency being produced from its Fourier transform, the principle frequency component is produced with a series of adjacent frequency components on either side of it. The use of tiling reduces the magnitude of these adjacent frequency components and as a direct result of this, less interference (constructive or destructive) occurs between adjacent image pixels, thereby improving the image quality.

Preferably, each tile is a whole tile, although it is possible to use fractions of a tile.

Embodiments relate to variants of the Gerchberg-Saxton algorithm by way of example only.

The skilled person will understand that the improved method disclosed herein is equally applicable to the calculation of a hologram used to form a three-dimensional reconstruction of an object.

Equally, the present disclosure is not limited to projection of a monochromatic image.

A colour 2D holographic reconstruction can be produced and there are two main methods of achieving this. One of these methods is known as "frame-sequential colour" (FSC). In an FSC system, three lasers are used (red, green and blue) and each laser is fired in succession at the SLM to produce each frame of the video. The colours are cycled (red, green, blue, red, green, blue, etc.) at a fast enough rate such that a human viewer sees a polychromatic image from a combination of the three lasers. Each hologram is therefore colour specific. For example, in a video at 25 frames per second, the first frame would be produced by firing the red laser for 1/75th of a second, then the green laser would be fired for 1/75th of a second, and finally the blue laser would be fired for 1/75th of a second. The next frame is then produced, starting with the red laser, and so on.

An alternative method, that will be referred to as "spatially separated colours" (SSC) involves all three lasers being fired at the same time, but taking different optical paths, e.g. each using a different SLM, or different area of a single SLM, and then combining to form the colour image.

An advantage of the frame-sequential colour (FSC) method is that the whole SLM is used for each colour. This means that the quality of the three colour images produced will not be compromised because all pixels on the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC (spatially separated colours) method is that the image is brighter due to all three lasers being fired at the same time. However, if due to space limitations it is required to use only one SLM, the surface area of the SLM can be divided into three parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced.

In embodiments, the SLM is a Liquid Crystal over silicon (LCOS) device. LCOS SLMs have the advantage that the signal lines, gate lines and transistors are below the mirrored surface, which results in high fill factors (typically greater than 90%) and high resolutions.

LCOS devices are now available with pixels between 2.5 µm and 15 µm.

Figure 10:
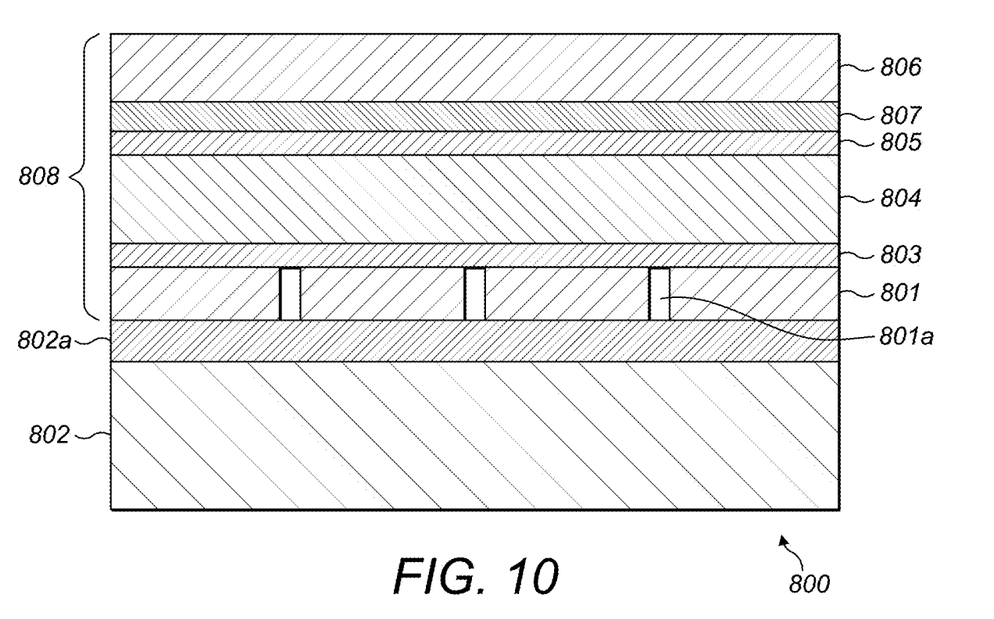
FIG. 10 is a schematic of a LCOS SLM.

The structure of an LCOS device is shown in FIG. 10.

An LCOS device is formed using a single crystal silicon substrate (802). It has a 2D array of square planar aluminium electrodes (801), spaced apart by a gap (801a), arranged on the upper surface of the substrate. Each of the electrodes (801) can be addressed via circuitry (802a) buried in the substrate (802). Each of the electrodes forms a respective planar mirror. An alignment layer (803) is disposed on the array of electrodes, and a liquid crystal layer (804) is disposed on the alignment layer (803). A second alignment layer (805) is disposed on the liquid crystal layer (404) and a planar transparent layer (806), e.g. of glass, is disposed on the second alignment layer (805). A single transparent electrode (807) e.g. of ITO is disposed between the transparent layer (806) and the second alignment layer (805).

Each of the square electrodes (801) defines, together with the overlying region of the transparent electrode (807) and the intervening liquid crystal material, a controllable phase-modulating element (808), often referred to as a pixel. The effective pixel area, or fill factor, is the percentage of the total pixel which is optically active, taking into account the space between pixels (801a). By control of the voltage applied to each electrode (801) with respect to the transparent electrode (807), the properties of the liquid crystal material of the respective phase modulating element may be varied, thereby to provide a variable delay to light incident thereon. The effect is to provide phase-only modulation to the wavefront, i.e. no amplitude effect occurs.

A major advantage of using a reflective LCOS spatial light modulator is that the liquid crystal layer can be half the thickness than would be necessary if a transmissive device were used. This greatly improves the switching speed of the liquid crystal (a key point for projection of moving video images). A LCOS device is also uniquely capable of displaying large arrays of phase only elements in a small aperture. Small elements (typically approximately 10 microns or smaller) result in a practical diffraction angle (a few degrees) so that the optical system does not require a very long optical path.

It is easier to adequately illuminate the small aperture (a few square centimetres) of a LCOS SLM than it would be for the aperture of a larger liquid crystal device. LCOS SLMs also have a large aperture ratio, there being very little dead space between the pixels (as the circuitry to drive them is buried under the mirrors). This is an important issue to lowering the optical noise in the replay field.

Using a silicon backplane has the advantage that the pixels are optically flat, which is important for a phase modulating device.

Whilst embodiments relate to a reflective LCOS SLM, the skilled person will understand that any SLM can be used including transmissive SLMs.

The invention is not restricted to the described embodiments but extends to the full scope of the appended claims.

The invention claimed is:

1. A head-up display for a windscreen having spatially variant optical power, the head-up display comprising:
   a diffuser arranged to display an image, wherein the diffuser has a curved surface shaped to compensate for the spatially variant optical power of the windscreen; and
   a holographic projector configured to project the image for display onto the curved surface of the diffuser such that the image is in non-planar focus on the curved surface of the diffuser, the holographic projector comprising:
      a spatial light modulator arranged to apply a phase-delay distribution to incident light, wherein the phase-delay distribution comprises phase-only data representative of an object and phase-only data arranged to provide a lensing effect adapted to bring the image to a non-planar focus on the curved surface of the diffuser; and
      Fourier transform means arranged to perform a Fourier transform of phase modulated light received from the spatial light modulator and form the image in non-planar focus on the curved surface of the diffuser.

2. The head-up display of claim 1, further comprising a mirror arranged to receive light from the diffuser and redirect the received light onto the windscreen.

3. The head-up display of claim 2, wherein the mirror has optical power.

4. The head-up display of claim 3, wherein the mirror is a parabolic mirror.

5. The head-up display of claim 1, wherein the windscreen forms part of an optical system arranged to form a virtual image of the real image displayed by the diffuser.

6. The head-up display of claim 1, further comprising a laser arranged to produce the incident light for the spatial light modulator.

7. A method of manufacturing the head-up display of claim 1, the method comprising:
   shaping the curved surface of the diffuser to compensate for the spatially variant optical power of the windscreen.

8. The head-up display of claim 1, wherein the Fourier transform means is a physical lens.

9. The head-up display of claim 1, wherein the Fourier transform means is a phase-only lens implemented on the spatial light modulator.

10. A method of forming a virtual image for a head-up display using an optical system comprising a windscreen having spatially variant optical power, the method comprising:
    displaying a real image in non-planar focus on a curved surface of a diffuser by projecting the real image onto the curved surface of the diffuser, wherein the curved surface of the diffuser is shaped to compensate for the spatially variant optical power of the windscreen, and wherein projecting the image in non-planar focus onto the curved surface of the diffuser comprises:
       illuminating a spatial light modulator with incident light to apply a phase-delay distribution to the incident light, wherein the phase-delay distribution comprises phase-only data representative of an object and phase-only data arranged to provide a lensing effect adapted to bring the real image to a non-planar focus on the curved surface of the diffuser; and
       performing a Fourier transform of the phase modulated light received from the spatial light modulator and forming the image in non-planar focus on the curved surface of the diffuser; and
    forming a virtual image of the real image using the optical system comprising the windscreen.

11. The method of claim 10, wherein the optical system further comprises a mirror, and forming the virtual image comprises receiving light from the diffuser at the mirror and redirecting the received light onto the windscreen using the mirror.

12. The method of claim 11, wherein the mirror has optical power.

13. The method of claim 12, wherein the mirror is a parabolic mirror.

14. The method of claim 10, wherein the incident light is produced by a laser.

* * * * *